N. MISETA.
DIRIGIBLE HEADLIGHT FOR MOTOR VEHICLES.
APPLICATION FILED NOV. 19, 1913.
1,090,870.
Patented Mar. 24, 1914.
2 SHEETS—SHEET 1.
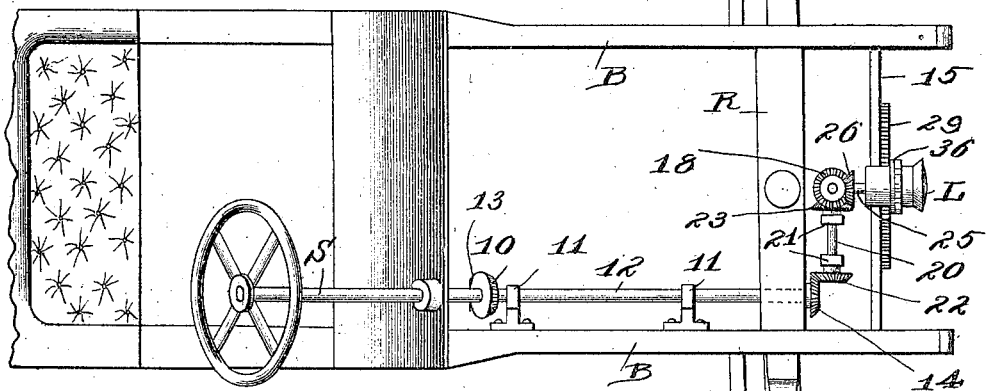
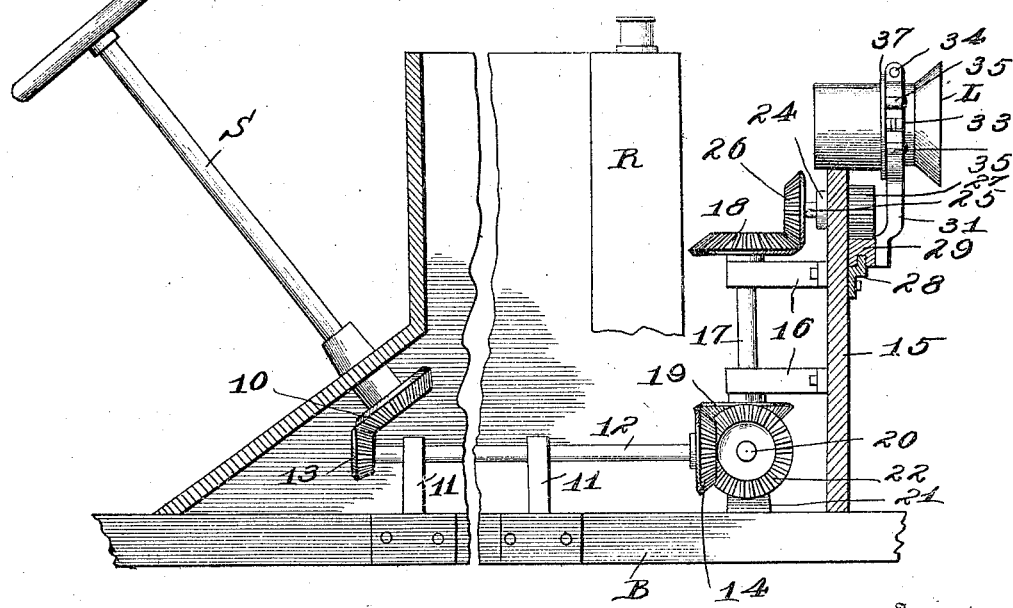
Witnesses
Inventor
Nicolas Miseta,
By A. M. Wilson
Attorney

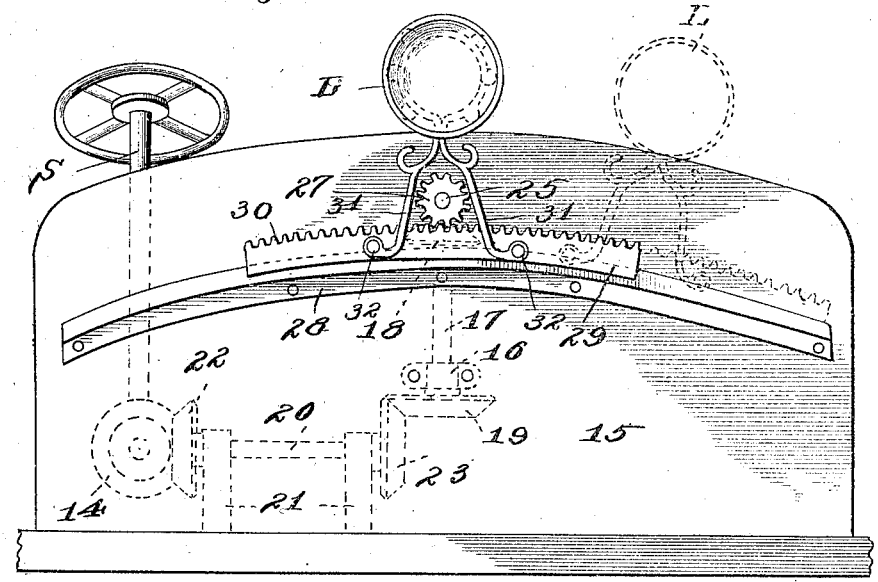
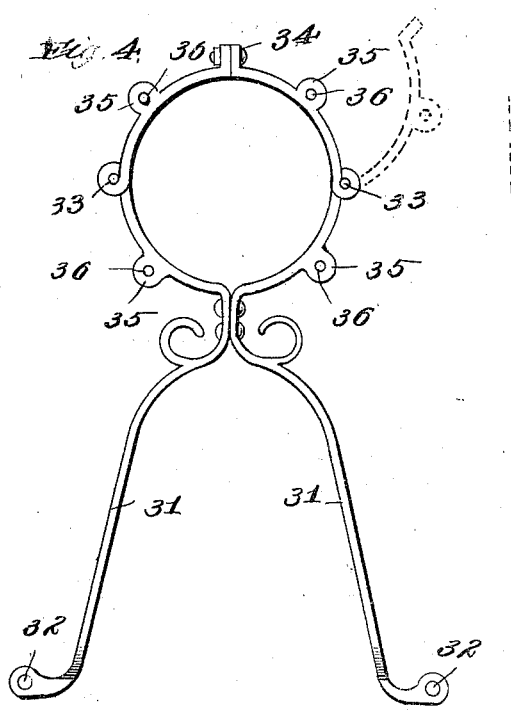
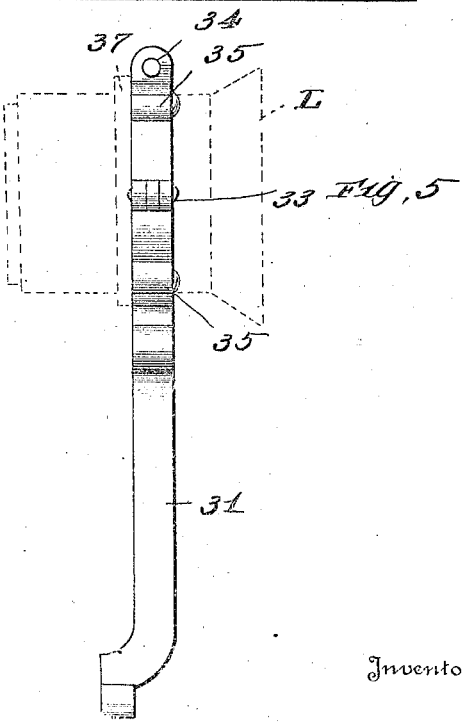

UNITED STATES PATENT OFFICE.

NICOLAS MISETA, OF BETTENDORF, IOWA.

DIRIGIBLE HEADLIGHT FOR MOTOR-VEHICLES.

1,090,870.  Specification of Letters Patent.  Patented Mar. 24, 1914.

Application filed November 19, 1913. Serial No. 801,842.

*To all whom it may concern:*

Be it known that I, NICOLAS MISETA, a subject of the King of Hungary, residing at Bettendorf, in the county of Scott and State of Iowa, have invented certain new and useful Improvements in Dirigible Headlights for Motor-Vehicles, of which the following is a specification.

This invention relates to certain new and useful improvements in dirigible head lights for motor vehicles.

The object of the present invention is to provide a head light which may be readily connected to the steering mechanism of an automobile and controlled thereby.

A further object of the invention is to provide an adjustable head light which is movable transversely of the automobile and may be moved either to the right or left accordingly as the automobile is turned.

With the above and other objects in view, the invention will be more specifically described in detail and then claimed, reference being had to the accompanying drawings, wherein like characters indicate like parts throughout the several views in which—

Figure 1 is a top plan view of the front portion of an automobile with my improved shiftable head light attached thereto. Fig. 2 is a side elevation of the front portion of an automobile, partly in section and partly broken away and showing the manner of connecting the shiftable head light with the steering post. Fig. 3 is a front elevation of an automobile with the head light applied and showing in dotted lines the position assumed by the head light when the machine turns to the left, and Figs. 4 and 5 are front and side elevations, respectively, of the lamp support.

With the head lights of an automobile mounted upon stationary supports, considerable inconvenience is occasioned when the machine is turning a corner, and it is the object of the present invention to overcome this inconvenience by the employment of a single lamp which shifts in both directions to assume positions at the extreme sides of the machine.

With the view of more clearly showing the present invention, the connections between the steering post and front axle of the machine have been omitted, and any appropriate steering mechanism may be employed, as the same does not form a part of this invention, my device being adaptable to machines of various manufacture.

Referring more particularly to the drawings illustrating my invention, the steering post is designated S and extends through the foot board and has mounted upon the lower end thereof a beveled gear 10. A pair of brackets 11 are suitably mounted on the inner face of one of the side bars B of the frame and constitute a pair of trunnions for a horizontal shaft 12. A bevel pinion 13 is fixedly secured on the inner end of the shaft 12 and meshes with the gear 10 upon the lower end of the steering post. A similar gear 14 is carried by the other end of the shaft 12.

A front board or plate 15 is mounted in any suitable manner adjacent the front end of the side bars and is carried thereby. The plate 15 is disposed forwardly of the radiator R to afford a space therebetween. The inner face of the front board 15 has connected thereto in any suitable manner a pair of brackets 16 arranged in vertical alinement, and similar to the brackets 11, which brackets form bearings for a vertical shaft 17. The upper and lower ends of the shaft 17 carry a bevel gear 18 and 19 respectively for a purpose to be hereinafter described. A second horizontal shaft 20 is mounted in suitable bracket bearings 21 similar to the brackets heretofore described and carries upon its ends bevel gears 22 and 23. It is to be noted that the several gears above mentioned engage each other in the order named, the gear 10 carried by the steering post S meshing with the gear 13, gear 14 meshing with gear 22, and gear 23 meshing with gear 19.

A suitable bearing 24 is carried by the front board 15 centrally thereof and adjacent the upper edge and provides a bearing for a stub shaft 25 upon the inner end of which is mounted a beveled gear 26 meshing with the gear 18 upon the upper end of the vertical shaft 17. The forward or outer end of the stub shaft 25 carries a small pinion 27 fixedly secured thereto.

Preferably as shown, the upper edge of the front board 15 is curved and carried by the front face of the board 15 and parallel to the upper edge thereof is a curved track 28. A rack bar 29 of similar curvature is mounted upon the track and is adapted to move thereover by operation of the gears before mentioned. It is to be noted that the pinion 27 engages the upper toothed edge 30 of the rack bar 29.

It is the idea of the present invention to mount the lamp upon the rack bar 29 and any convenient support or mounting may be employed but in this instance a preferred embodiment thereof is shown in Figs. 4 and 5. The lamp support comprises more specifically a pair of legs 31 spaced at their lower ends and provided with suitable openings 32 in the ends thereof to receive bolts or similar fastening means by which the same is secured to the bar 29. The upper end of the lamp support is of circular configuration and is adapted to surround the body of the lamp L. The upper end of the support is hinged at the points 33 and joined together as at 34 in any suitable manner. Projections 35 are formed integral with the support and are provided with openings 36 to receive suitable fastening means which engage a collar or band 37 carried by the lamp which tends to securely hold the same in position.

The operation of the device is as follows: When the machine turns to the right or the steering wheel is moved in such direction the intermeshing gears above described are operated and through their medium the pinion 27 revolves and being in engagement with the rack bar 29, moves said rack bar over the track 28 in a direction to the right. It is therefore evident that the lamp being carried by said rack bar the same is caused to be moved to the right of the machine a distance to be controlled by the degree of turning of said steering wheel. The lamp is moved to the left when the reverse operation of the steering wheel takes place.

While I have shown and described the preferred embodiment of my invention I do not wish to confine myself to such showing, as various forms, modifications, combinations and arrangements of the parts may be had without departing from the scope of the invention as claimed.

I claim:—

1. The combination with the steering post of an automobile, of a lamp mounted for movement bodily across the front of the automobile, a track on which said lamp travels, and means connecting the lamp and steering post whereby the operation of the steering post imparts movement to the lamp.

2. A lamp for automobiles comprising in combination with the steering post of an automobile, a track extending across the front of the automobile, a rack-bar movable on said track, a lamp carried by said rack-bar, and gear connections between said rack-bar and the steering post whereby the lamp is moved bodily across the front of the automobile as the steering post is operated.

3. Automobile lamp operating means comprising in combination with the steering post of an automobile, and a lamp movable bodily across the front of the automobile, a support on which said lamp is movable, and gear connections between the steering post and the lamp for moving the latter as the steering post is operated.

In testimony whereof I affix my signature in presence of two witnesses.

NICOLAS MISETA.

Witnesses:
JOHN E. BROWNLEE,
GEORGE BRATER.